United States Patent [19]

Reed

[11] Patent Number: 5,170,696
[45] Date of Patent: Dec. 15, 1992

[54] FOOD PRODUCT AND METHOD AND APPARATUS FOR PREPARING FOOD PRODUCTS

[76] Inventor: Claude A. Reed, 4810 S. 136th St., Omaha, Nebr. 68137

[21] Appl. No.: 735,835

[22] Filed: Jul. 25, 1991

Related U.S. Application Data

[60] Division of Ser. No. 307,298, Feb. 6, 1989, abandoned, and a continuation of Ser. No. 566,882, Aug. 13, 1990, abandoned.

[51] Int. Cl.$^5$ .................. A47J 37/04; A47J 37/06; A47J 37/12; A47J 43/18
[52] U.S. Cl. .................................. 99/349; 99/353; 99/404; 99/407; 99/410; 99/419; 99/533
[58] Field of Search .............. 99/403, 353, 407, 352, 99/410, 404, 416, 417, 419, 420, 421 R, 421 TP, 349, 532, 533, 535

[56] References Cited

U.S. PATENT DOCUMENTS

| | | |
|---|---|---|
| 2,244,145 | 6/1941 | Erickson .................. 99/410 X |
| 2,244,168 | 6/1941 | Miller ...................... 99/410 X |
| 2,770,182 | 11/1956 | Jensen ...................... 99/419 |
| 3,026,790 | 3/1962 | Arvan ....................... 99/407 |
| 3,736,859 | 6/1973 | Carlson ..................... 99/352 |
| 3,996,847 | 12/1976 | Reed ........................ 99/419 |
| 4,170,933 | 10/1979 | Meamber .................... 99/349 |
| 4,217,817 | 8/1980 | Meamber .................... 99/349 |
| 4,261,258 | 4/1981 | Reed ........................ 99/404 |
| 4,539,900 | 9/1985 | Reed ........................ 99/353 |
| 4,690,044 | 9/1987 | Verkler ..................... 99/419 |

Primary Examiner—Timothy F. Simone
Attorney, Agent, or Firm—Willian Brinks Olds Hofer Gilson & Lione

[57] ABSTRACT

Apparatus in which a food product is cooked by being impaled on a plurality of heated grills that extend substantially therethrough. In this simplified apparatus, an operator rotates a first handle, which causes the elements of a separator to drop under gravity to a position among the grills and which further causes a press to descend to impale the food product onto the grills. The operator pulls and releases a second handle, which causes a container of heated cooking medium to raise and cook the food product, a cooking timer to start, the container to be lowered at the end of a predetermined cooking time, and the separator element to raise from the grills, thereby separating the food product from the grills. All of the above operations may be accomplished without the use of a motor or similar power source. Also disclosed is an improved food product and method of preparing the same, in which a composite is formed of two patties and a garnish, the garnish being added in advance, before cooking on the plurality of grills, to significant economic benefit.

15 Claims, 7 Drawing Sheets

FOOD PRODUCT AND METHOD AND APPARATUS FOR PREPARING FOOD PRODUCTS

This application is a divisional of U.S. Ser. No. 07/307,298 filed Feb. 6, 1989 now abandoned and a continuation of U.S. Ser. No. 07/566,882 filed Aug. 13, 1990, now abandoned.

BACKGROUND OF THE INVENTION

The following U.S. Pat. Nos. are hereby incorporated by reference:
3,996,847
4,261,258
4,315,950
4,446,775
4,539,900

The present invention and those described in the patents cited above relate to the preparation of food products, particularly proteinaceous food such as hamburger patties, using a plurality of projecting grills which are insertable into the food. In the latter four patents listed above, a liquid heating medium is provided for cooking a patty when impaled on the grills. Reference may be made to these patents for a more complete understanding and explanation of the structure of such grills and of methods and advantages of cooking food products using such grills.

SUMMARY OF THE INVENTION

The current invention provides an appliance for heating a food product that is impaled onto heating grills, the appliance being more compact than has heretofore been provided. Indeed, the appliance may fit easily on a counter top. As will appear more fully below, the apparatus also requires less energy to operate by making ingenious use of gravity and of manual energy provided by the operator. The apparatus also requires less skill to operate.

The current invention also provides a new food product and method of making the same. According to the new method, increased efficiency and improved management of the cooking site may be achieved by preparing in advance, such as overnight or at a remote site, composites of food products such as hamburger patties and a secondary food product, herein called a garnish. The garnish may, for example, be cheese, squash, cabbage, catsup, or the like. The garnish is sandwiched between two patties. Then, food products already containing a desired garnish may be prepared simply by impaling the composite on micro grills according to the present invention or according to apparatus disclosed in the patents that have been incorporated herein by reference. Desirably, the garnish may be introduced to the patties in a manner so as not to be coextensive with the patties. In such a case, during cooking the patties unite substantially as one at the areas where the garnish is absent. Where the garnish is confined to a central portion of the composite, the result is, in effect, a single burger having a garnish circumferentially sealed within the burger.

DETAILED DESCRIPTION OF THE PREFERRED EMBODIMENTS

Figure 1:
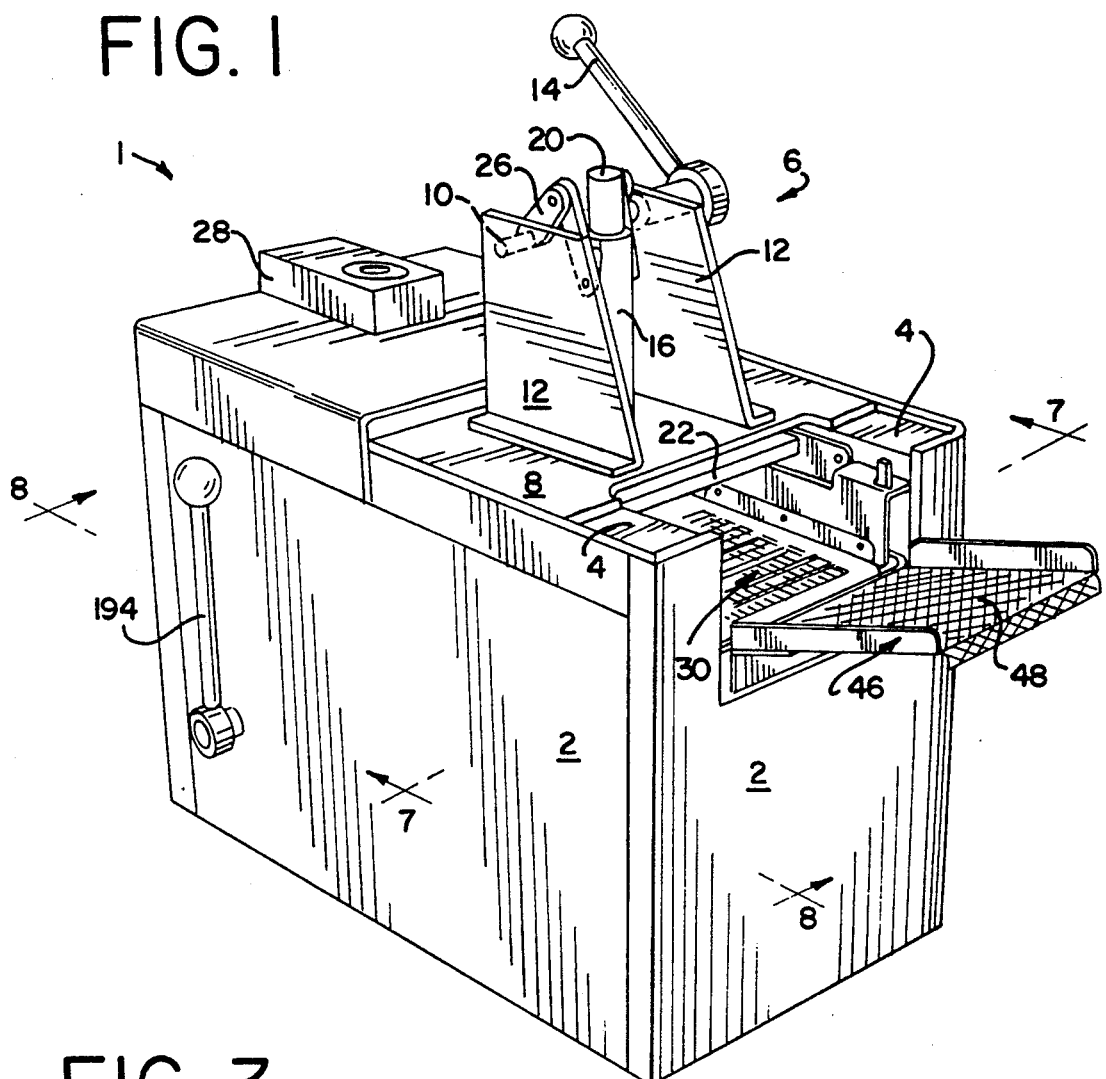
FIG. 1 is a perspective view of a preferred embodiment of an appliance according to the current invention.

FIG. 1 is a perspective view of a presently preferred embodiment of an appliance 1. There is illustrated a housing 2 being open at the right and right top in the drawing. Slidably mounted, for example on surfaces 4, is a press assembly in the form of a carriage 6.

Figure 7:
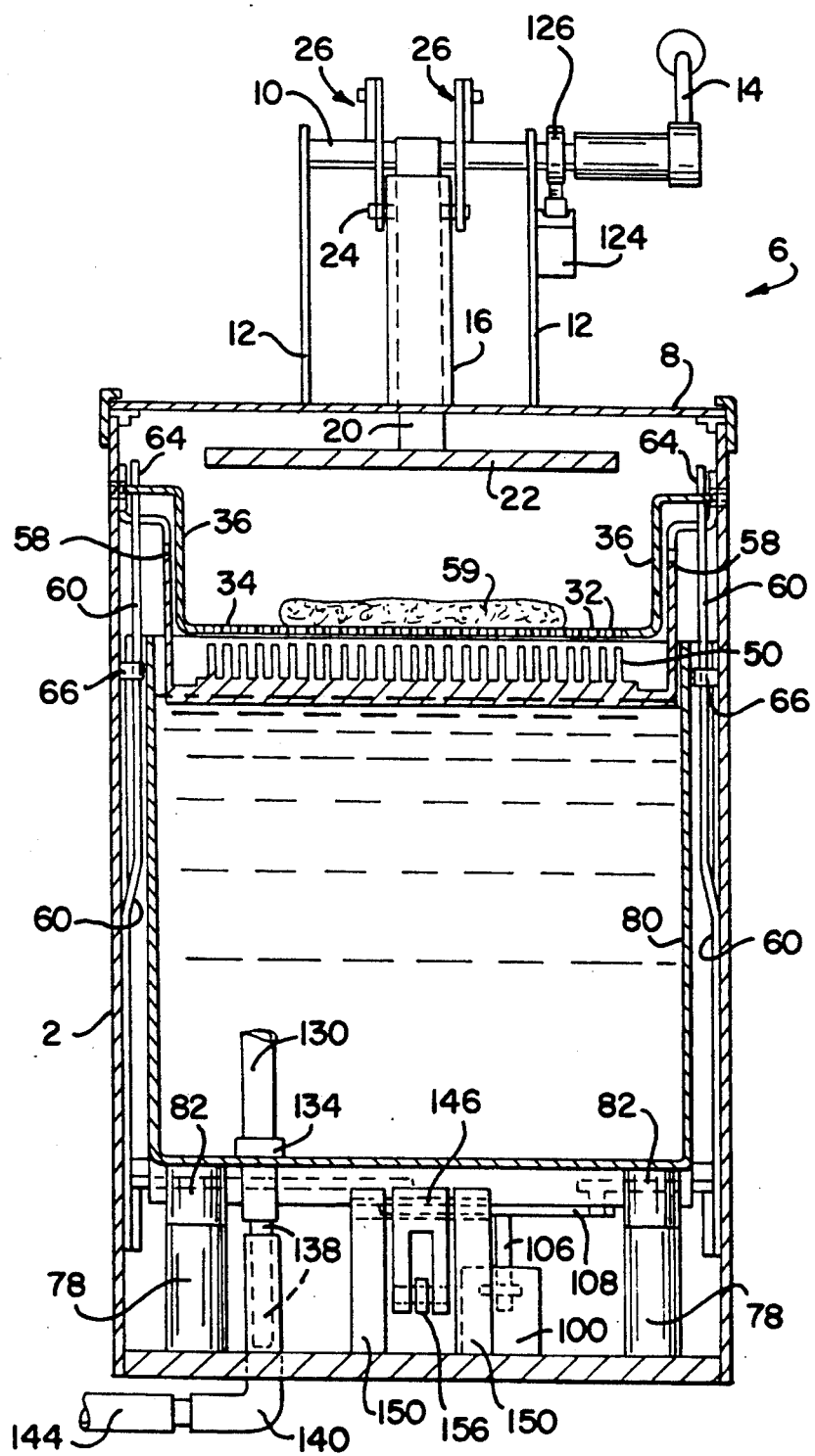
FIG. 7 is a vertical cross-section taken on line 7—7 of FIG. 1.
Figure 8:
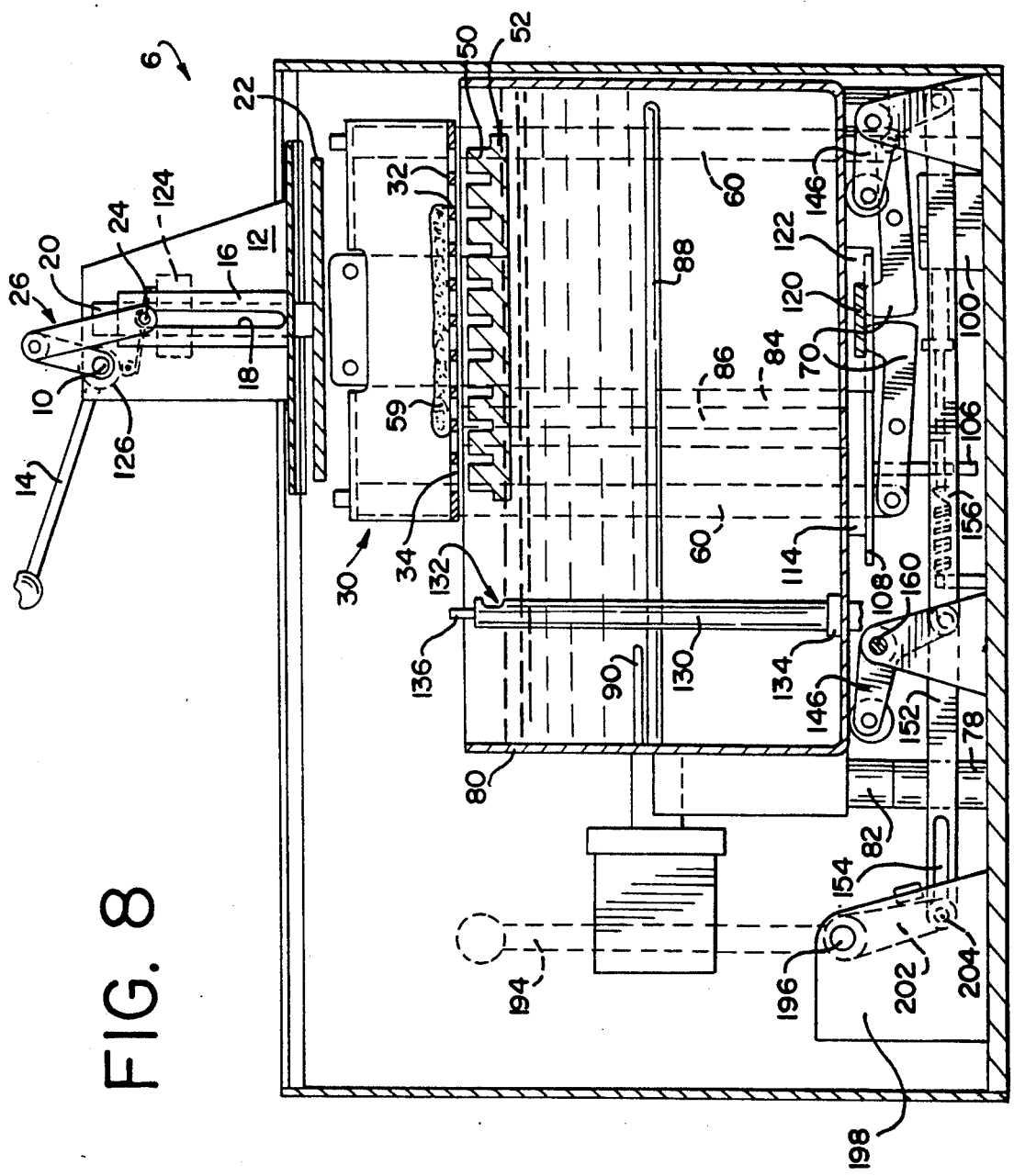
FIG. 8 is a vertical cross-section taken on at line 8—8 of FIG. 1, showing the container in its lower position, the grills and separator in their non-proximate position, and the press in its raised position.
Figure 9:
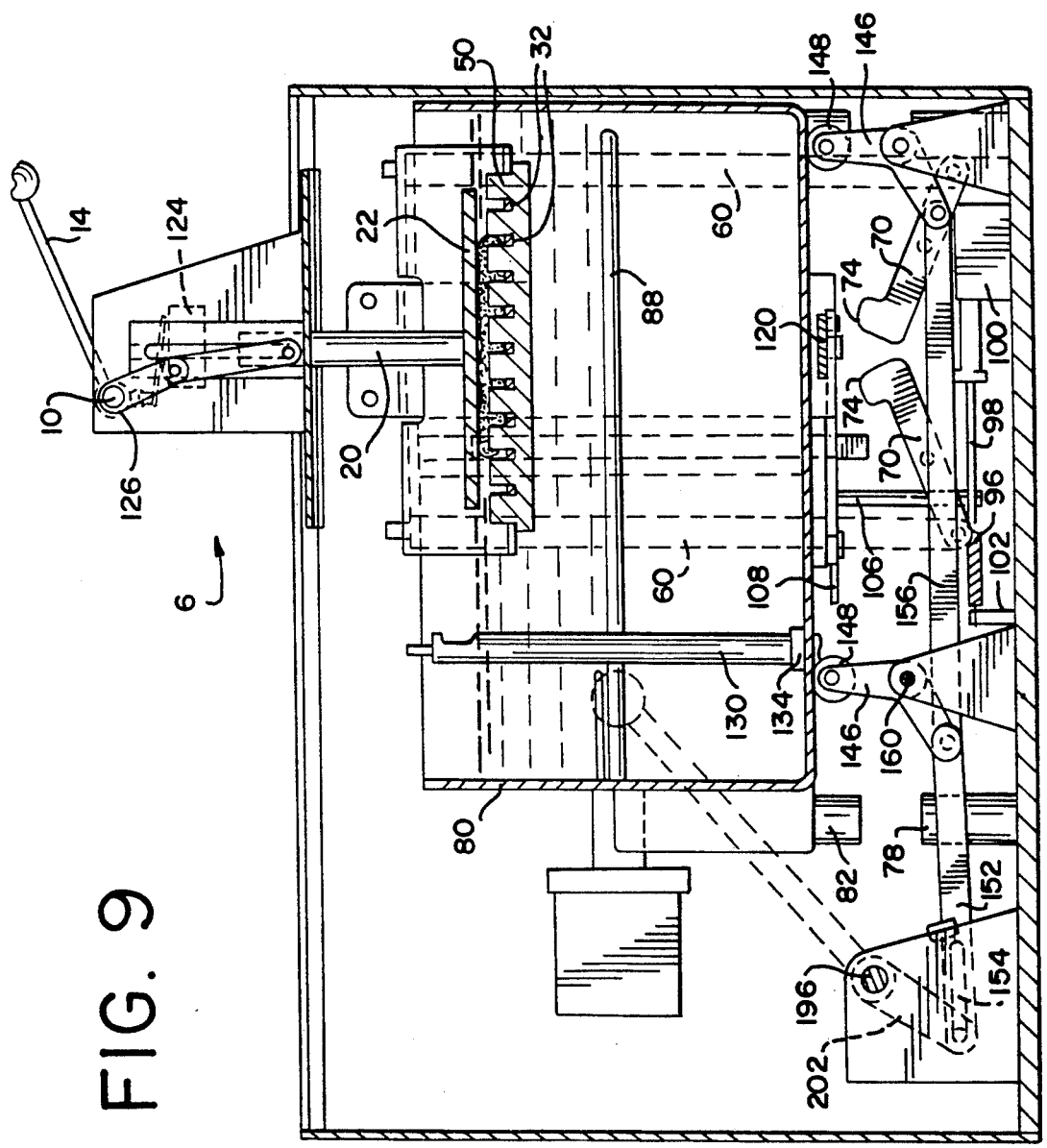
FIG. 9 is a view like that of FIG. 8, showing the container in its raised position, the grills and the separator in their proximate position, and the press in its lower position.

As also shown in FIGS. 7-9, the press carriage 6 includes a base 8 slidably mounted on the housing 2, a press axle 10 rotatably mounted above the base 8, for example as by housing members 12, and a press handle 14 attached to the axle 10. A press tube 16 is mounted on the base 8 and is provided with two longitudinal slots 18, one of which is shown in FIGS. 8 and 9. The press tube 16 freely receives a press rod 20 to which is fixedly mounted a substantially rectangular press 22.

A pin 24 freely passes through the slots 18 of the tube 16 and through the rod 20. Linkages 26 disposed on opposite sides of the tube 20 are fixed on the press axle 10. It will be understood that an operator may move press handle 14 in opposite directions to bring about a corresponding raising and lowering of press 22.

FIGS. 8 and 9 respectively show the press 22 in its raised and lowered positions. The press 22 may be retained in its raised position by any conventional means, such as a spring-loaded detent (not shown) between press tube 16 and press rod 20.

Figure 10:
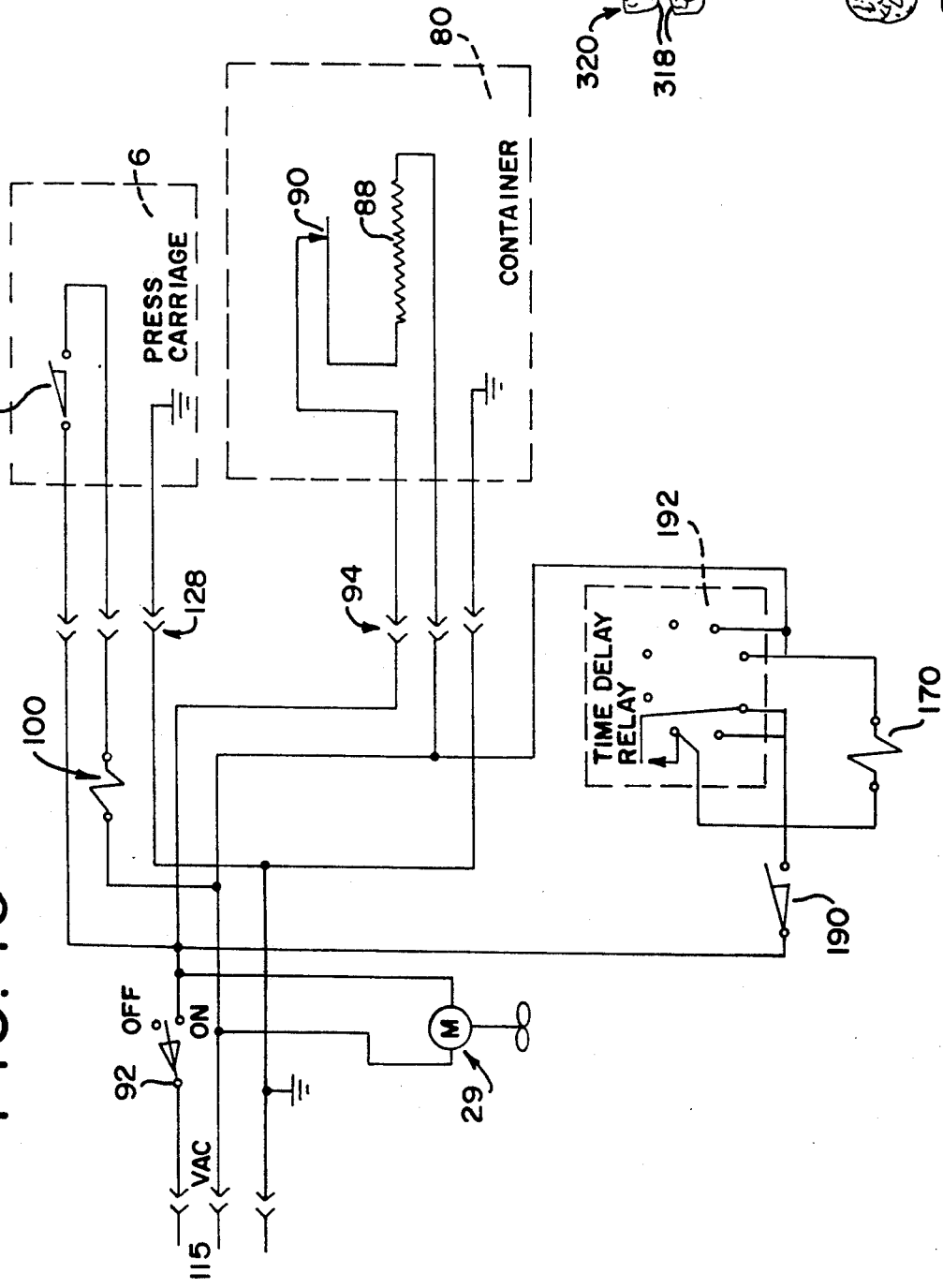
FIG. 10 is an electrical schematic of the embodiment illustrated in FIGS. 1-9.

Also shown in FIG. 1 is housing 28 for an exhaust fan 29 (FIG. 10). Although the current apparatus is capable of cooking food items on a repeated basis without significant generation of exhaust fumes or odor, the exhaust fan 29 may conveniently be used to vent water vapor from the housing 2 when the apparatus is being started from a cold condition, thereby helping to control condensation.

Figure 5:
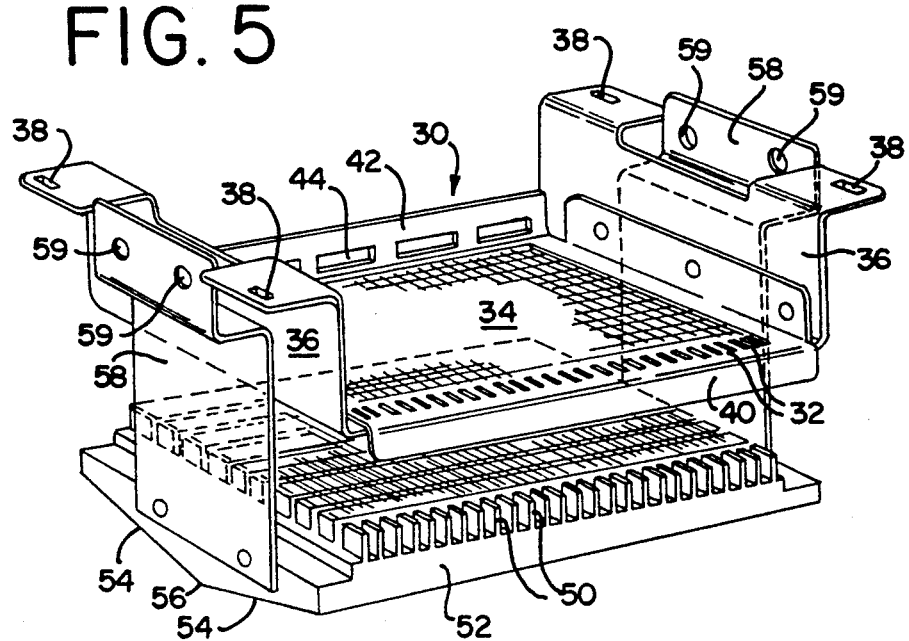
FIG. 5 is a perspective of a heating block having a plurality of heat conductive grills and an associated separator.

Also partly visible in FIG. 1 is a stripper or separator 30, which is better shown in FIG. 5. The separator includes a number of elements 32 that cooperate to form a food product resting surface 34. Opposite sides of the separator 30 are provided with L-shaped brackets 36. Respective horizontal portions of the brackets 36 have formed therein a total of four support openings 38, for a purpose to appear later.

The orientation in perspective of separator 30 is substantially the same in FIGS. 1 and 5. It will appear from FIG. 1 that an operator may conveniently use a spatula or the like to place and remove a food product onto resting surface 34. Such an operation would occur from the right as shown in FIG. 1. Accordingly, separator 30 may conveniently be provided with a front downwardly extending lip 40 and a rear upwardly extending lip 42 having openings 44 for the passage of grease and food debris from spatula operation. It may be seen that downwardly extending lip 40 serves to facilitate spatula access from the front, and upwardly extending lip 42 serves as a back stop for the spatula. In the alternative, any conventional form of placing and removing food products on resting surface 34 may be used.

Also shown in FIG. 5 are a plurality of heat conductive grills 50 that may be of a size and spacing as disclosed in any of the United States patents incorporated herein by reference. Presently preferred is a twenty by ten array of two hundred sixty grills 50, each about nine-sixteenths of an inch high. The grills 50 are of substantially uniform cross-section. They are ordinarily of substantially rectangular configuration, as depicted, and may be spaced between one-quarter and one-eighth inch apart.

In the present embodiment, the grills 50 are machined from a block 52 of aluminum, desirably having bottom surfaces 54 that taper to a ridge 56 in order to avoid splash, as will appear below. The block 52 containing the grills 50 is suspended from the brackets 58.

The separator 30 and grills 50 are mounted for relative motion between a non-proximate position shown in FIGS. 5, 7 and 8, and a proximate position shown in FIG. 9. In the preferred embodiment, the separator 30 reciprocates vertically, while the brackets 58 are fixed to the housing 2, as by bolts through holes 59.

The elements 32 of the separator 30 are adapted to fit among the grills 50 when in the proximate position, as shown in FIG. 9. Desirably, the elements 32 take the form of a rectangular grid formed by an array of openings in an otherwise solid piece of sheet metal or the like, the openings being configured to receive the grills 50. It is preferred for the block 52, including the grills 50, and the separator 30, to be coated with a non-stick substance such as polytetrafluoroethylene.

As also shown in FIG. 1, there may also be provided a drain tray 46 and a working surface in the form of a grate 48, for convenience in working with food items.

In operation, the press carriage 6 is initially in its rearward position as shown in FIG. 1, and the separator 30 is in its raised (non-proximate) position shown in FIGS. 1, 7 and 8. In this configuration, resting surface 34 of separator 30 is conveniently presented for removing a previously-cooked food item or receiving a food item to be cooked.

Following the placing of a food item 59 (FIG. 7) on resting surface 34, the separator 30 is lowered in a manner to be described so that the elements 32 of the separator 30 are disposed among the grills 50, as shown in FIG. 9. As part of this operation, the operator moves the handle 14 so that the press 22 moves from the raised position shown in FIG. 8 into the lowered position shown in FIG. 9, thereby impaling the food item 59 onto the grills 50. As soon as this impaling is achieved, the operator may again return the handle 14 to the position shown in FIG. 8, thereby raising the press 22.

Figure 2:
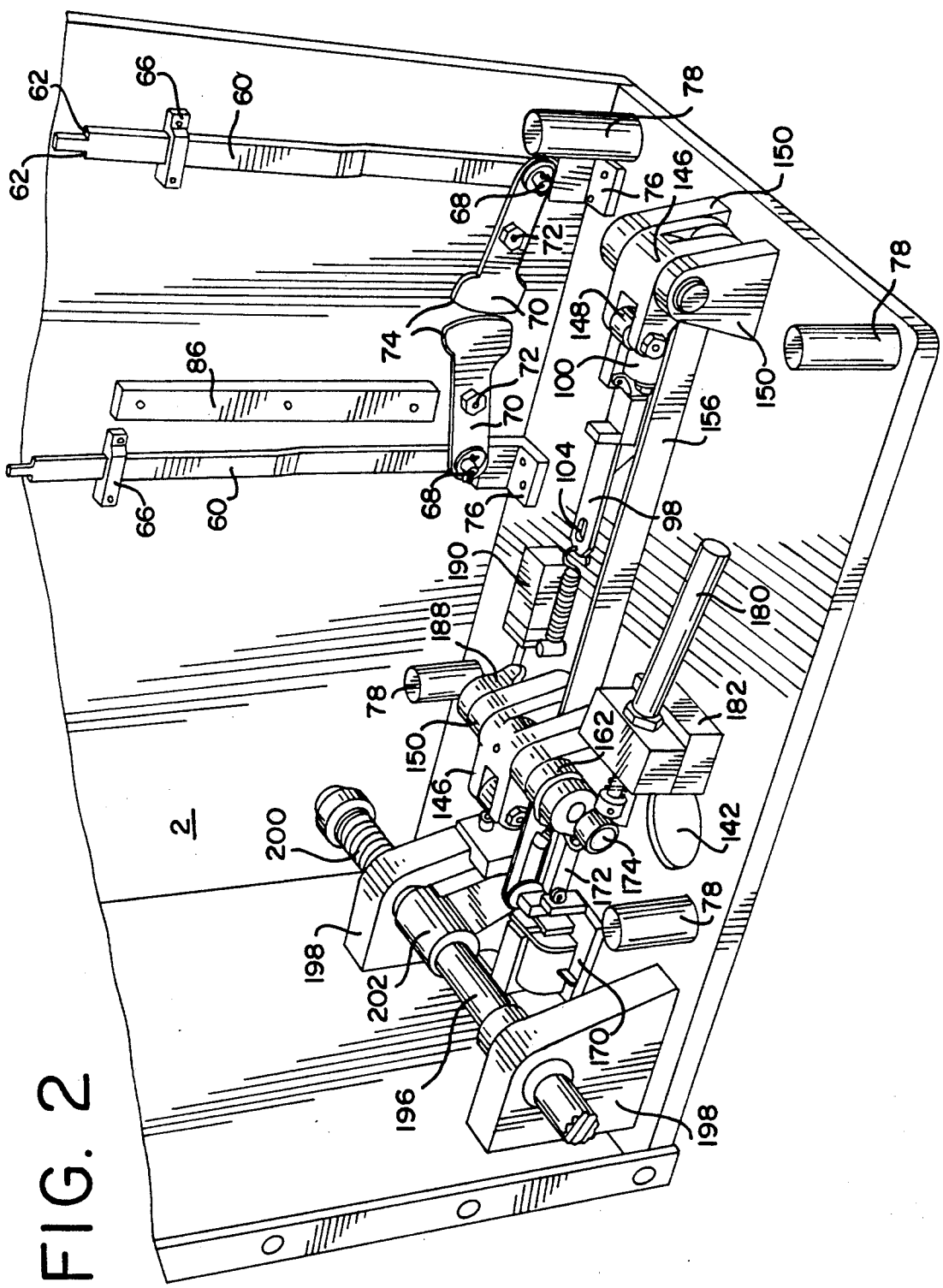
FIG. 2 is a perspective view, partially cut way, of certain of the mechanical and electrical components mounted within the housing of the current invention, the container of liquid cooking medium being removed.
Figure 6:
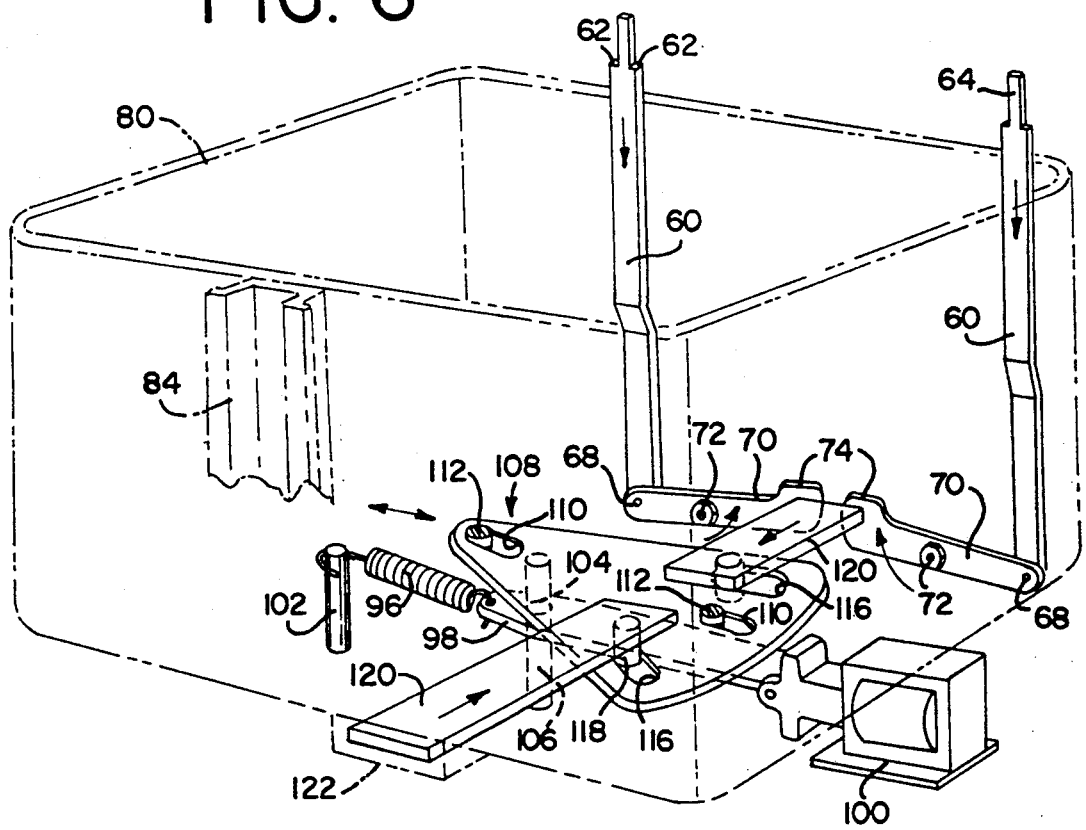
FIG. 6 is a perspective view illustrating apparatus used in raising and lowering the separator with respect to the grills.

For purposes of raising and lowering the separator 30, each of the separator support openings 38 (FIG. 5) receives the upper end of one of four support members 60, examples of which are best seen in FIGS. 2, 6 and 7. Shoulders 62 at the top of each support member 60 form a pin 64 that passes through one of the separator support openings 38, whereby the shoulders 62 support the separator. The support members 60 are slidably received in guides 66 (FIG. 2), which are fixed to the housing 2.

The lower end of each support member is pivoted, as at 68, to a respective rotatable member 70, which is mounted for rotation about an axis 72. In the preferred form best seen in FIGS. 2 and 6, a rotatable member 70, two of which are shown in the drawings, is in the form of a lever that is pivoted for rotation about an axis at a point roughly intermediate its opposite ends.

Near the end of each lever 72 opposite from the pivot 68, an upper surface 74 serves as a contact surface.

It will be seen that pressing on the contact surfaces 74 causes rotation of the levers 70, thereby raising the support members 60 and the supported separator 30. It may also be seen that, with the separator 30 in the raised position, freeing the levers 70 to rotate, as by removing a restraining force from the contact surfaces 74, will allow the separator 30 to drop into the proximate position described above. If needed, stops 76 (FIG. 2) may be used to limit rotation of the levers 70 and downward travel of the support members 60.

As most clearly shown in FIG. 2, four rigid posts 78 are fixed on the floor of the housing 2. A container 80 for a liquid cooking medium has a corresponding four stubs 82 fixed on the bottom thereof. The stubs 82 support the container 80 atop the posts 78 when the container 80 is in the lowered position, as shown in FIGS. 7 and 8.

Shown in phantom in FIG. 6 is the upper portion of a track 84 fixed on the outside of container 80 and having a U-shaped cross-section. A corresponding track, not shown, is fixed on the outside of the opposite wall of container 80. The tracks 84 receive guide rails 86 that are fixed to the housing 2, one of which is shown in FIG. 2. By these elements or similar elements, the container 80 is guided as it is raised and lowered.

Any conventional means may be used for heating the liquid cooking medium and for maintaining the cooking medium in its heated state. Because the container 80 moves, it is preferred to use electric heating means, such as one or more calrods 88. A thermostat 90 may conveniently be used to regulate the calrod 88. As shown in FIG. 10, the appliance is provided with an off/on switch 92, actuation of which will provide immediate electric power to the calrod 88 and to the previously-mentioned exhaust fan 29. Electric plugs 94, shown only in FIG. 10, may be provided for removing the container 80 from the rest of the apparatus, for convenience in servicing or the like.

Referring again to FIG. 6, there is shown a tension spring 96 connected to a linking bar 98 which in turn is connected to a solenoid 100. For reasons that will become apparent, the solenoid 100 will be called a separator solenoid. As shown in FIG. 2, these elements are mounted on the floor of the enclosure 2. Separator solenoid 100 is mounted directly on the floor, and tension spring 96 is connected to the floor through spring post 102. The linking bar 98 has a hole 104 formed therethrough.

Referring back to FIG. 6, a long pin 106 is received, preferably very loosely, in hole 104 of linking bar 98. As may be seen in FIGS. 8 and 9, the lower end of pin 106 is free. At its upper end, pin 106 is fixed on a cam member 108. A pair of parallel mounting slots 110 are formed in the cam member 108. Two cam mounting bolts 112 pass upwardly through the mounting slots 110 and enter cam mounting block 114 (FIG. 8) which, in turn, is fixed on the bottom of the container 80. Because the heads of the bolts 112 are larger than the slots 110, the cam member 108 remains attached to the bottom of the container 80 and is free to slide to the left and right as shown in FIG. 6.

Because of the manner in which pin 106 is received in hole 104, it may be seen that the spring 96 constantly biases the cam member 108 to the left in FIG. 6, and that actuation of the separator solenoid 100 will move the cam member 108 to the right in FIG. 6 against the bias of spring 96 for so long as the solenoid 100 is actuated.

As shown in FIG. 9, the pin 106 is long enough to remain received in the hole 104 even when the container 80 with attached cam member 108 is in the raised position.

The cam member 108 is provided with a pair of camming slots 116 that angle inwardly in the direction away from separator solenoid 100. A follower pin 118 is received in each camming slot 116. Each pin 118 is fixed on a respective retractable member 120, here taking the form of a bar having a rectangular cross-section. Each retractable member 120 is horizontally disposed and slidingly received in a channel mount 122, the channel mount being fixed on the bottom of the container 80. Accordingly, the retractable members 120, like the cam member 108, travel up and down with the container 80.

With separator solenoid 100 in its normally inactive state, spring 96 biases cam member 108 to the left in FIG. 6, causing the retractable members 120 to achieve their normally extended state, not shown in FIG. 6.

When the retractable members 120 are in their extended states, they extend beyond the levers 70. When the container 80 is in the lowered state shown in FIG. 8 and the retractable members are extended, they press down on the contact surfaces 74 of the levers 70, keeping the levers 70 fully rotated, the support members 60 fully lifted, and the separator 30 in its nonproximate position. This configuration is shown in FIG. 8, wherein a food item 59 to be cooked has been placed on the resting surface 34 of the separator 30. When in this configuration, it may be seen that actuation of the separator solenoid 100, which may be a brief actuation, will pull to the right in FIG. 6 the linking bar 98 against the force of the spring 96. This action, by virtue of the camming slots 116, will cause a retraction of the retractable members 120 to the position shown in FIG. 6. With the retractable members 120 no longer disposed immediately above the contact surfaces 74 of the levers 70, the levers 70 are free to rotate, and the separator 30 descends under the action of gravity into its proximate position.

Because of the rotation of the levers 70 during the descent of the separator 30, the contact surfaces 74 will then be disposed above the level of the retractable members 120. The separator solenoid 100 may be disengaged as soon as this configuration is achieved, whereupon the retractable members will attempt to extend under the bias of spring 96 but will be stopped by side faces of the levers 70.

As shown schematically in FIG. 10, the current invention includes a separator solenoid switch 124 for operating the separator solenoid 100. Also as shown in this schematic, it is preferred for the separator solenoid switch 124 to be mounted on or associated with the press carriage 6.

The preferred location and operation of separator solenoid switch 124 is best shown in FIG. 7. Switch 124 is mounted so as to be operated by a separator solenoid switch cam 126 fixed on the press axle 10. Moving the handle 14 causes the cam 126 to operate the switch 124 which in turn, as has been explained, results in the descent of the separator 30 under the action of gravity. The single action of the operator in moving the handle 14 serves a dual function. It drops the separator 30, and it moves the press 22 against the food product 59 for impaling and pressing the food product 59 onto the grills 50.

Other locations of the separator solenoid switch 124 and methods of operation may be devised, but it is preferred for the switch 124 to be so associated with the press carriage 6 that it responds either to the actual or incipient lowering of the press 22.

Electrical plugs 128 (FIG. 10) are provided to facilitate removal of the press carriage 6 from the rest of the apparatus for ease of servicing or the like.

In order to cook the now-impaled food product 59, the container 80 is raised from its lowered, non-cooking position shown in FIG. 8 to the raised, cooking position shown in FIG. 9. It is preferred that the liquid level of the cooking medium be maintained as shown in FIGS. 8 and 9. At this level, a portion of the aluminum block 52 is submerged in and warmed by the cooking medium when the container is in its lower position. In this configuration, the grills 50 are kept in a pre-warmed state. With the level of the cooking medium in the container at such a level, the grills and food product 59 are submerged when the container 80 is raised to the position shown in FIG. 9. Submerging the food product in the medium provides certain advantages, and is presently preferred by the inventor.

When the aluminum block 52 is partially submerged but the grills 50 and the food product are not, cooking can still be accomplished, but at a slower rate. Accordingly, if desired, the fluid level in the container 80 may be maintained at such a level that the aluminum block 52 does not contact the cooking medium when the container is in the lower, non-cooking position and is only partially submerged when the container 80 is in the raised position.

Parenthetically, it should be noted that FIG. 9 discloses a configuration of the appliance that is not normally intended to be achieved during actual cooking. In particular, the press 22 normally will be raised before the container 80 is raised. This aspect of FIG. 9 is provided for purposes of illustration to show the lowered state of the press 22 and the associated elements of the press assembly.

In order to establish and maintain the desired fluid level in container 80, there is provided within the container 80 an overflow tube 130 having an overflow opening 132 at the desired level.

Extending through the bottom of the container 80 is a fluid-tight overflow penetration 134. The overflow tube 130 may be removably received in the penetration 134, as by a bayonet mount or the like. For this purpose, a wing 136 or the like may be provided at the top of the overflow tube 130 for use as a handgrip. The removable character of the overflow tube 130 facilitates the complete draining of the container 80, when desired.

As shown in FIG. 7, a drain extension tube 138 extends downward from the penetration 134. The extension tube 138 is fixed in the penetration 134 and is loosely received in a drain elbow 140 that is fixed on the enclosure 2 and extends outwardly of the enclosure 2, for example through a drain hole 142 (FIG. 2) in the bottom or side of the enclosure. From there, the liquid medium may be drained to any desired location by a drain hose 144 connected to the elbow 140.

As shown in FIG. 7, the length of the drain extension tube 138 is such that it remains received within the elbow 140 when the container 80 is lifted into its raised position.

Apparatus associated with the raising and lowering of the container will now be described.

A container lifter is provided which, in the preferred embodiment, takes the form of at least one and preferably two bell cranks 146 having rollers 148, as best seen in FIGS. 2, 7 and 8. The bell cranks 148 are pivotally mounted on the floor of the enclosure 2 by mounting bosses 150. A bell crank link 152 having a longitudinal slot 154 formed therein is drivingly connected to the left-most bell crank 146 shown in the drawings. Where a second bell crank is used, a second bell crank link 156 may drivingly connect the first and second bell cranks.

When the link 152 is pulled to the left in the drawings, the bell cranks 146 are forced in clockwise rotation, causing their rollers 148 to roll along the bottom of the container 80, thereby lifting it. As the bell cranks 146 are moved through an angle of approximately ninety degrees, the container is lifted to its full upright position.

The left-most of the two bell cranks 146 is mounted on a long shaft 160 and fixed against rotation with respect to the shaft, as by a key or the like. The shaft 160 extends outwardly in both directions beyond the mounting bosses 150 and mounts additional elements, as will now be described.

Figure 3:
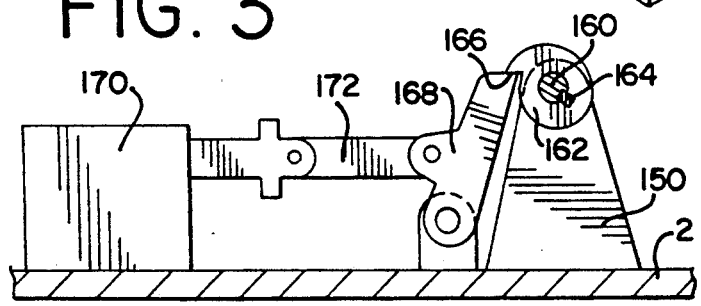
FIG. 3 is a side elevation of a holding cam and pawl used for releasably retaining the container in an elevated position.

As shown in FIGS. 2 and 3, a holding cam 162 is mounted on the shaft 160 and fixed against rotation with respect to the shaft 160, as by a key 164. As the container is raised, the holding cam 162 rotates until an engaging surface 166 formed thereon encounters a pawl 168. The pawl 168 drops toward the shaft 160, engaging the engaging surface 166. This engagement causes the container 80 to be retained in its raised position, because both the holding cam 162 and a bell crank 146 are fixed against rotation with respect to the same shaft 160.

The pawl 168 is connected to a solenoid 170 by a pawl linkage 172. It may be seen that momentary actuation of the solenoid 170 will cause the pawl 168 to withdraw from the holding cam 162, thereby allowing the container 80 to descend into its lowered position. For this reason, the solenoid 170 will be referred to as the container solenoid.

Figure 4:
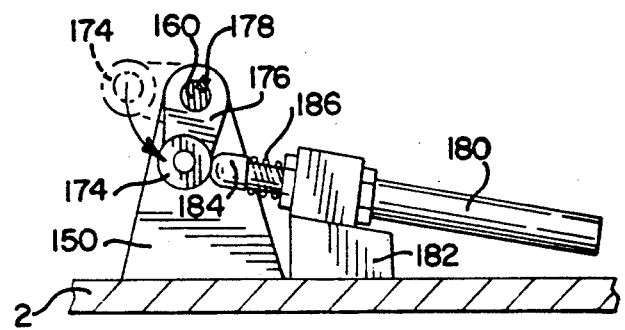
FIG. 4 is a side elevation of apparatus used for slowing or cushioning the descent of the container into its lower position.

Adjacent the holding cam 162, and as shown in FIGS. 2 and 4, the shaft 160 also mounts an eccentric actuator such as an eccentric roller 174 mounted on a crank arm 176. The eccentric actuator formed by the roller and crank arm, or the like, is mounted on shaft 160 and fixed against rotation with respect to the shaft 160, as by a key 178 or the like.

A shock absorber 180 is fixed by a shock absorber mount 182 on the housing 2. The shock absorber 180 has an actuator 184 that is outwardly biased by compression spring 186.

With the container 80 in its lowered position, the eccentric roller 174 is disposed in the configuration shown in solid line in FIG. 4. In this configuration, the compression spring 186 presses the actuator 184 of the shock absorber 180 against the roller 174.

As the container is raised, the roller 174 assumes the position shown in phantom in FIG. 4. The actuator 184 of the shock absorber 180 extends under the influence of the spring 186.

As the container descends under the action of gravity following the removal of pawl 168 from holding cam 162, the return of the eccentric roller 174 against the extended shock absorber actuator serves to cushion and retard the drop of the container 80.

With reference to FIG. 2, the opposite end of shaft 160 mounts a timer limit switch arm 188. The timer limit switch arm 188 is fixed against rotation with respect to the shaft 160, as by a key. The arm 188 controls a timer limit switch 190, mounted on the floor of the housing 2. In particular, the switch 190 is cycled open and closed as the container 80 is raised and lowered.

As shown in FIG. 10, the apparatus also includes a counter such as a time delay relay 192. The relay 192, timer limit switch 190, and container solenoid 170 are electrically related as shown in FIG. 10. As the shaft 160 is turned for raising the container, the timer limit switch arm 188 actuates the timer limit switch 190, thereby turning on the timing function of time delay relay 192. After a predetermined cooking time as established by the relay 192, the relay actuates the container solenoid 170, removing the pawl 168, thereby allowing the container to descend under the action of gravity.

It should be recalled with respect to the discussion of FIG. 6 that, once the retractable members 120 have released the levers 70, as shown in FIG. 6, and the separator solenoid 100 is de-actuated by return of the press handle 14 to its original position, the retractable members 120 are thereafter biased outwardly against the faces of the levers 70. When the container 80 is raised, it carries with it the retractable members 120, which snap outwardly under the influence of spring 96 as soon as they clear the contact surfaces 74 of the levers 70. Accordingly, when the container is in the raised position shown in FIG. 9, the retractable members 120 are in their fully extended positions. In this configuration, the distal ends of the retractable members 120 are disposed immediately above the contact surfaces 74 of the levers 70. When the container 80 later descends to its lowered position, the retractable members 120 contact and press against the contact surfaces 74 of the levers 70, thereby causing the levers 70 to rotate about their axes, to lift the support members 60, and to raise the separator 30 into its non-proximate position. By this action, the elements 32 of the separator lift the cooked food product 59 from the grills 50. The energy used in raising the separator 30 and in separating the food product from the grills is provided by the weight of the container 80 and the liquid cooking medium therein. Both the descent of the container 80 and the lifting of the separator 30 occur as a result of the timed actuation of the container solenoid 170.

Preferred apparatus for pulling the bell crank link 152 will now be described.

A manually operable side lever 194 is shown in FIGS. 1, 8 and 9. Side lever 194 rotates a main shaft 196 which, as shown in FIG. 2, is rotationally mounted within main shaft bosses 198 that are fixed on the floor of the enclosure 2. Main shaft return spring 200 tends to urge main shaft 196 in rotation for the side lever to assume the position shown in FIG. 8. As also shown in FIGS. 8 and 9, a lift arm 202 is mounted on main shaft 196 and fixed against rotation with respect to the shaft. A lift arm pin 204 passes through the distal end of lift arm 202 and also through slot 154 of the crank arm link 152.

With the container in its lowered position as shown in FIG. 8, the operator moves the side lever 194, clockwise in the drawings, until it assumes the position shown in FIG. 9. This causes lift arm 202 to move clockwise in FIGS. 8 and 9, carrying with it lift arm pin 204 which, being disposed in the left end of slot 154, pulls link 152 to the left, thereby lifting the container 80.

As soon as the container 80 is lifted and the holding pawl 168 has engaged the holding cam 162, the operator may release the side lever 194. Under the action of spring 200, side lever 194 will resume the position shown in FIG. 8. During this action, link 152 remains stationary, and pin 204 slides to the right in slot 154.

The invention described above and other embodiments falling within the scope of the appended claims display a number of unique characteristics and advantages.

The appliance is quite compact, being able to fit on a countertop.

The skill required to employ this apparatus and method is lower than that required for the apparatus and methods disclosed in the United States patents that have been incorporated herein by reference. One reason for this is that the operator performs only two operations on the appliance in order to cook a food product. The first operation is cycling the press handle 14. As described above, this one operation serves both to drop the separator 30 into its proximate position and to impale the food product 59 onto the grills 50. The second operation is the simple expedient of pulling and releasing the side lever 194. The result of this operation is the raising of the container 80, the timing of the cooking operation, the release of the container, the dropping of the container, and the raising of the separator 30.

A further advantage according to the current invention is that the above operations may be achieved without the use of motors. This advantage serves not only to increase the reliability of the apparatus but also to require less electric energy. Even the separator 30 may be raised without the use of a motor by using the weight of the descending container and its cooking medium and, indirectly, the work expended by the operator in moving the handle 194 to raise the container and its cooking medium.

Figure 11:
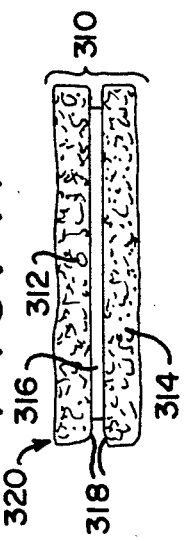
FIG. 11 is a vertical cross-section of a composite according to a first stage in a method according to the current invention.
Figure 12:
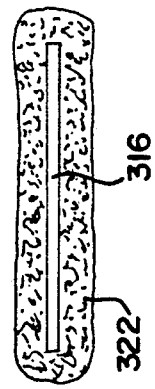
FIG. 12 is a view like FIG. 11, following cooking.

Now with reference to FIGS. 11 and 12 there will be described a new method of preparing a food product, and the product prepared. The method and product of FIGS. 11 and 12 are not limited to preparation by using method and apparatus disclosed elsewhere in this specification. Methods and apparatus disclosed in the United States patents that have been incorporated herein by reference may be used.

The method and the product illustrated in FIGS. 11 and 12 relate to the provision of a food product formed from patties of proteinaceous substance having a secondary product disposed therebetween. The secondary food product is different in composition from that of either patty and is not a mere seasoning such as salt or pepper. For the sake of readability, the secondary food product will hereafter be referred-to as a "garnish," and the act of introducing a secondary food product will be termed "garnishing."

It will be understood that the terms "garnish" and "secondary food product" are intended to be used quite broadly to include any food product that may be combined with a different edible substance and may be heated in a cooking operation. For example, when a garnish is to be added to a hamburger patty, the garnish may comprise such diverse substances as cheese, onion, bacon, cabbage, squash, broccoli, catsup, and carrots. Excellent garnishes can be made of complex carbohydrates. The garnish may comprise more than one substance.

In a typical commercial cooking operation such as a fast food franchise, garnishes are added after cooking by garnishers. Under many circumstances, cooking can proceed more quickly than garnishing. It also requires different skills. Accordingly, both cooks and garnishers have been needed at the cooking site.

Garnishing food after cooking undesirably cools the food. Also important is the fact that, according to conventional past practice, garnishing must be accomplished at the cooking site. This requirement calls for the provision at the cooking site of a garnishing station and sufficient equipment to accommodate the garnish. For each different garnish used, a separate container is needed. Refrigerated cake space typically is needed. For these and additional reasons, the number of different garnishes used tends toward a minimum.

Now turning to the current method, FIG. 11 is a transverse cross-section of a composite 310. The composite comprises upper and lower members 312, 314 such as hamburger patties or other proteinaceous substances. The patties 312, 314 may be, but are not necessarily, of substantially identical composition. The composite 310 has been formed by disposing a garnish 316 between the patties 312, 314. The composition of the garnish is different from that of either patty 312, 314.

If desired, additional layers of patties and garnish may be used in forming the composite 310. Typically, but not necessarily, the patties 312, 314 will be coextensive. By this is meant that they have substantially congruent shapes when viewed from above. For example, if patties 312, 314 were round hamburger patties, they would form circles of substantially equal diameters.

Preferably, the garnish 316 is not coextensive with either patty, so that portions of opposite faces 318 of the patties are opposed across a gap, preferably in the border areas 320 of the patties.

Most preferably, the garnish 316 is confined to the central area of the composite, so that the opposing faces 318 are formed all the way around the entire border 320 of the composite.

A large number of the composites 310 may be formed in advance, as will be described more fully below. Then, when cooking time comes, the composite 318 is impaled on a plurality of grills 50 so that the grills extend substantially through the composite from one side thereof to a point at least closely proximate an opposite side thereof. At least the grills, preferably the entire composite, are heated to a temperature and for a time sufficient to cook the patties.

According to the current method, the garnish may be added quite far in advance and in a different location. The options available for this garnishing in advance range from the more simple practice of garnishing during off-hours all the way to an elaborate commercial enterprise in which large numbers of composites are made at a remote manufacturing plant, commissary, catering department or the like. In such an operation, proper machinery and labor suited to the task can provide savings from such factors as economies of scale. Indeed, a single manufacturing plant might serve an entire country or region of a country.

A greater variety of garnishes may be commercially available at the cooking site—they are part of the composite—without requiring a commensurate increase in refrigerated cake space and other garnishing equipment. The need to use garnishers at the cooking site is eliminated.

Traditional grilling operations do not permit garnishing in advance. For example, consider the example of grilling a cheeseburger according to the traditional flat-grill method. Before applying cheese to that side of the patty that is to receive it, it is necessary to grill that side of the patty. Otherwise it will remain substantially raw, or at least rawer than the opposite side. In contrast, using micro grills 50 allows one to garnish in advance with commercial success and efficiency.

An additional advantage of the current invention may be seen by inspection of FIG. 12, which shows a vertical cross-section of a new and unique food product that may be produced by the method set forth above. Where there had been opposed faces of two separate patties, 312, 314 and a gap in the garnish, the two patties have become joined as one, substantially forming a single proteinaceous mass 322 with garnish 316 enclosed therein.

When one cooks the preferred composite shown in FIG. 11 in which the garnish 316 is confined to the central areas of the composite, the resulting FIG. 12 product is a food product in which the garnish 316 is confined to the inner portions of the product. The patties have been joined substantially as one around the entire borders thereof, so that the borders of the cooked composite surround the garnish in the center.

It is thought that the joining of two patties substantially as one such as occurs herein, when combined with a garnish, is not achievable in traditional cooking methods but only by impaling the composite 310 on a plurality of grills such as the grills 50. The resulting product is superior to an ordinary similar garnished food product, may be produced less expensively, and has commercial appeal because of its unusual construction.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

I claim:

1. An appliance for heating a food product that is impaled onto heating grills comprising:
   a plurality of heat conductive grills, each having an end for insertion into the food product;
   the plurality of grills mounted in an array and sized to be inserted as a group into the food product;
   a container for a liquid cooking medium;
   means for heating the cooking medium;
   a separator having elements sized to fit among the grills, the separator elements forming a resting surface for the food product;
   the separator and grills being relatively movable between a proximate position in which the separator elements are disposed among the grills such that the ends of the grills extend above the resting surface of the separator, and a non-proximate position in which the resting surface is disposed above the ends of the grills;
   first moving means for causing relative movement of the separator elements and grills from the non-proximate into the proximate position;
   second moving means for raising the container against the force of gravity from a lowered position into a raised cooking position for heating at least the grills such that heat passes from the grills into the food product for cooking the food product;
   the second moving means comprising means allowing the container to resume the lowered position;
   the first and second moving means comprising mechanical means responsive to the descent of the container into the lowered position to cause relative movement of the grills and separator from the proximate to the non-proximate position, said mechanical means using the weight of the container and cooking medium to provide the energy for said relative movement into the non-proximate position.

2. The apparatus of claim 1, the grills being fixed, the mechanical means lifting the separator against the force of gravity in response to the descent of the container into the lowered position.

3. The apparatus of claim 2, comprising separator actuation means, including the first moving means, for releasably retaining the separator in the non-proximate position and, upon the release thereof, for allowing the separator to descend under gravity into the proximate position.

4. The apparatus of claim 3 comprising:
   a press disposable above the grills for selective contact with a food product and for pushing the food product onto the grills so that the grills become imbedded within the food product;
   a press handle operatively connected to the press for causing movement of the press in response to movement of the handle; and
   separator actuation means responsive to motion of the press handle for releasing the separator actuation means when the press handle is moved in a direction for pressing a food product onto the grills.

5. The apparatus of claim 1, the grills being fixed, the mechanical means lifting the separator against the force of gravity in response to the descent of the container into the lowered position, further comprising:
   a rotatable member operatively connected to the separator, rotation of the rotatable member in opposite directions being effective to raise and lower the separator, respectively; and
   a retractable member adapted, when in an extended position, to push against a contact surface of the rotatable member for holding the separator in the non-proximate position, retraction of the retractable member from the extended position freeing the rotatable member and allowing the separator to descend.

6. The apparatus of claim 5, the retractable member being mounted on the container so that descent of the container with the retractable member in the extended position causes contact between the retractable member and the contact surface of the rotatable member, further descent of the container causing the retractable member to rotate the rotatable member and lift the separator.

7. The apparatus of claim 5, further comprising a press assembly for pushing the food product onto the grills so that the grills become imbedded within the food product and separator actuation means responsive to operation of the press assembly for retracting the retractable member.

8. The apparatus of claim 7, wherein the separator actuation means comprises a solenoid for retracting the retractable member, an electric switch, and means disposed on the press assembly for operating the switch upon operation of the press assembly.

9. The apparatus of claim 1, comprising:
a member mounted for rotation about an axis;
a support member responsive to rotation of the rotatable member for causing said relative movement of the grills and the separator; and
a movable member mounted on the container for horizontal movement with respect to the container and for vertical movement with respect to the rotatable member upon vertical movement of the container, the movable member comprising means for contacting the rotatable member during descent of the container for causing relative movement of the grills and separator into the non-proximate position.

10. The apparatus of claim 9, further comprising means for moving the movable member horizontally out of contact with the rotatable member, thereby freeing the rotatable member for rotation and allowing the grills and separator to achieve the proximate position.

11. The apparatus of claim 10, comprising a cam member mounted on the container, a spring biasing the cam member, and cam moving means for selectively moving the cam member against the bias of the spring, the cam selectively moving the movable member out of contact with the rotatable member.

12. The apparatus of claim 1,
the second moving means comprising a shaft mounted for rotation about an axis thereof, means for selectively rotating the shaft, and a container lifter mounted on the shaft and fixed against rotation with respect to the shaft, rotation of the shaft resulting in the lifting and lowering of the container,
the apparatus further comprising a holding cam mounted on the shaft and fixed against rotation with respect to the shaft, and a pawl cooperating with the holding cam to retain the container in the elevated position when the shaft is rotated in a first direction.

13. The apparatus of claim 12, wherein the container lifter comprises a crank, and the means for selectively rotating the shaft includes means for selectively moving the crank.

14. The apparatus of claim 12, further comprising a shock absorber responsive to rotation of the shaft for slowing the descent of the container.

15. The apparatus of claim 12, further comprising:
a timer;
means responsive to operation of said second moving means for starting the timer; and
a solenoid responsive to the timer for withdrawing the pawl from the holding cam a predetermined time following actuation of the timer.

* * * * *